United States Patent [19]

Meyer et al.

[11] 3,908,360

[45] Sept. 30, 1975

[54] PUMP METERING FUEL CONTROL SYSTEM

[75] Inventors: Gene A. Meyer, West Simsbury; John S. Jenkins, Simsbury, both of Conn.

[73] Assignee: Chandler Evans Inc., West Hartford, Conn.

[22] Filed: Jan. 14, 1974

[21] Appl. No.: 433,229

Related U.S. Application Data

[63] Continuation-in-part of Ser. No. 330,603, Feb. 8, 1973, abandoned.

[52] U.S. Cl. .......................................... 60/39.28 R
[51] Int. Cl.² ............................................. F02C 9/06
[58] Field of Search ................... 60/39.28 R, 39.28 T

[56] References Cited
UNITED STATES PATENTS

| | | | |
|---|---|---|---|
| 2,812,715 | 11/1957 | Redding | 60/39.28 R |
| 2,961,828 | 11/1960 | Wheeler | 60/39.28 T |
| 3,118,491 | 1/1964 | Simons | 60/39.28 R |
| 3,128,822 | 4/1964 | Tyler | 60/39.28 R |
| 3,240,013 | 3/1966 | Späth | 60/39.28 R |
| 3,478,512 | 11/1969 | Brahm | 60/39.28 R |
| 3,596,467 | 8/1971 | Avery | 60/39.28 R |
| 3,618,315 | 11/1971 | Avery | 60/39.28 R |
| 3,736,072 | 5/1973 | Turner | 60/39.28 R |
| 3,779,007 | 12/1973 | Lavash | 60/39.28 R |
| 3,832,846 | 9/1974 | Leeson | 60/39.28 R |

*Primary Examiner*—Clarence R. Gordon
*Attorney, Agent, or Firm*—Radford W. Luther; Richard A. Dornon

[57] ABSTRACT

A fuel control system has an electric motor-driven, positive displacement metering pump located in a fuel tank for supplying and metering fuel to an engine. The speed of the motor is determined by an electronic scheduling device which senses various engine parameters and generates a signal indicative of a scheduled fuel flow. A motor control circuit is responsive to the signal from the scheduling device to control the speed of the motor in accordance with the signal's magnitude. A vapor core pump is in series flow relationship with the positive displacement pump to raise the pressure of the metered fuel to a level required for engine delivery. A throttling type differential pressure regulator is disposed intermediately of the pumps to maintain a constant pressure rise across the positive displacement pump so that fuel flow is a linear function of motor speed, and also to throttle flow to the vapor core pump. Alternatively, the metering pump may be driven by means of a controllable clutch assembly connected to an engine driven shaft.

8 Claims, 5 Drawing Figures

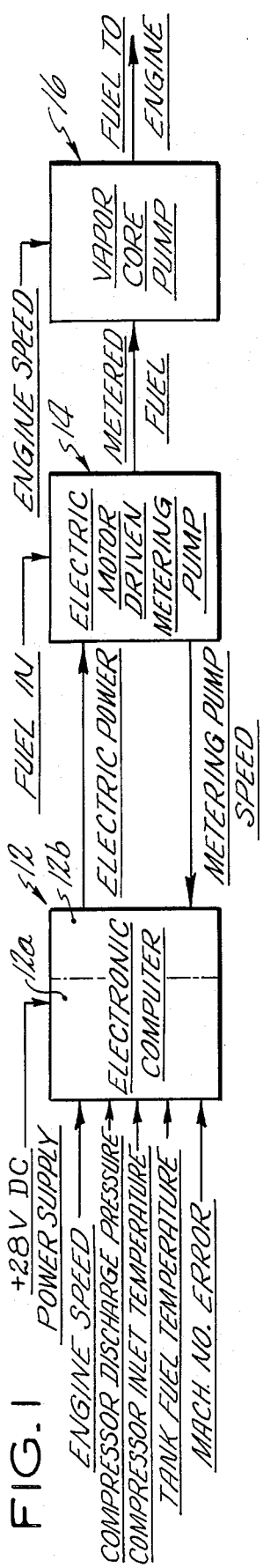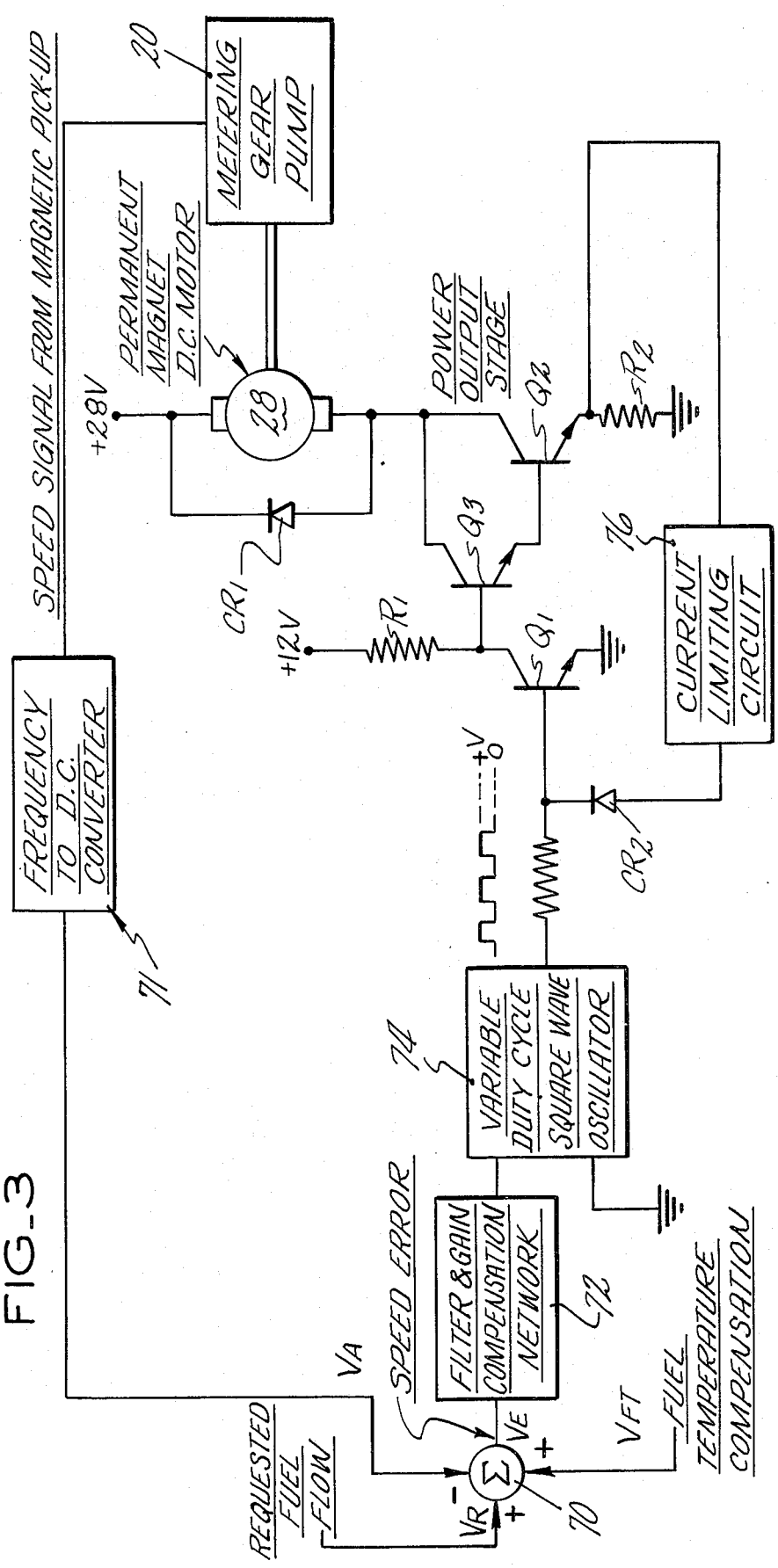

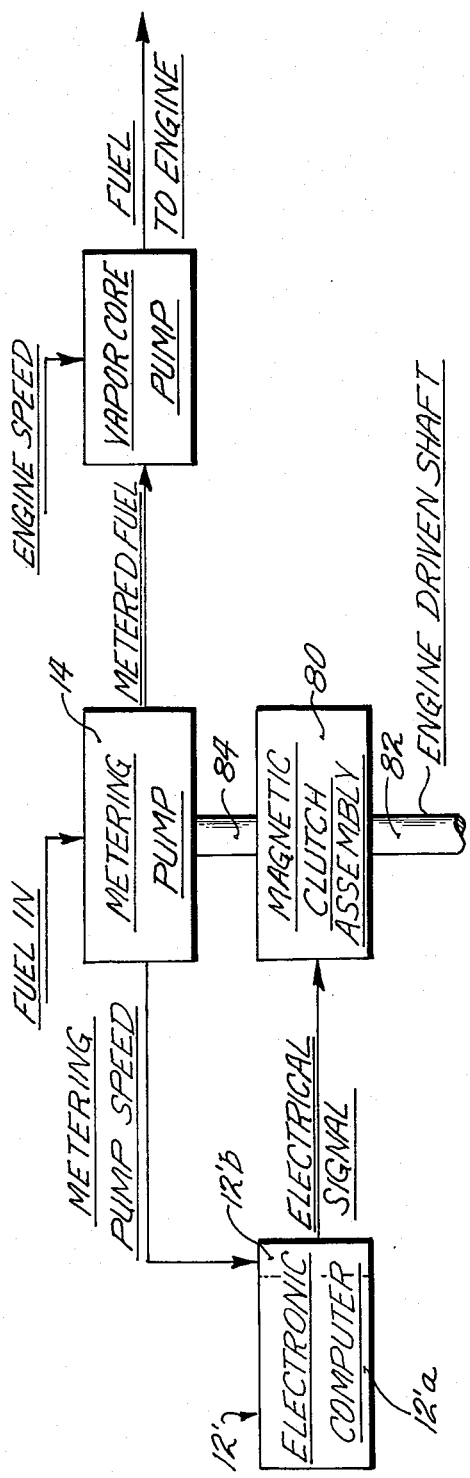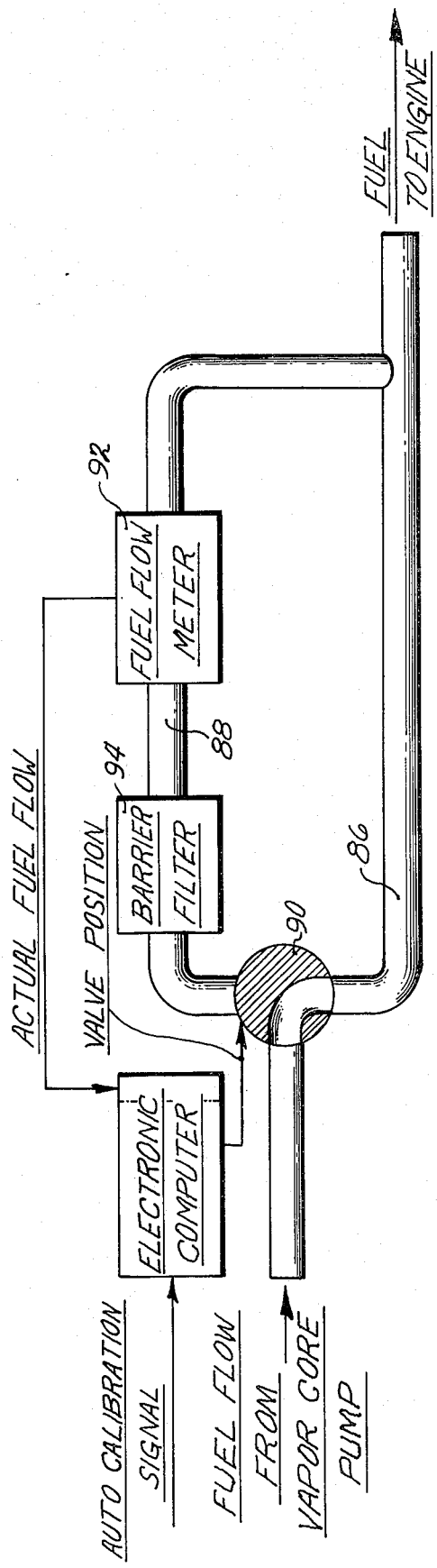

PUMP METERING FUEL CONTROL SYSTEM

CROSS-REFERENCE TO RELATED APPLICATIONS

This is a continuation-in-part of application Ser. No. 330,603, filed Feb. 8, 1973, entitled "Pump Metering Fuel Control System" which is now abandoned.

BACKGROUND OF THE INVENTION

This invention relates to fuel control systems, and more particularly to fuel control systems for gas turbine engines.

A conventional fuel control system for a gas turbine engine comprises a boost pump (or an alternative means for fuel tank pressurization), an engine driven main fuel pump, and a metering control adapted to sense various engine parameters for controlling the rate of fuel flow to the engine's combustion chambers in accordance therewith. Main fuel pumps in existing fuel control systems are generally fixed displacement gear pumps or vane pumps which provide output flows which exceed engine fuel requirements under certain conditions (e.g., high altitude operations). Such main fuel pumps therefore necessitate the by-passing of fuel which engenders fuel heating, impairs pumping efficiency and creates other problems.

If a centrifugal pump is employed as the main pumping element in a fuel control system, starting flow requirements mandate that it be of a size sufficient to generate the necessary pressure at low engine speeds and thus at high engine speeds the generated pressure may be excessive. Also, a centrifugal pump alone is not capable of furnishing the dry-lift essential to the proper functioning of most fuel control systems. The latter considerations therefore normally render a positive displacement pump an indispensable component of a fuel control system.

Fuel control systems which incorporate engine driven variable displacement pumps have been developed to overcome the aforementioned difficulties. In such a system, the variable displacement pump serves not only to pump fuel, but also to meter fuel. Although a properly designed system incorporating a variable displacement pump yields satisfactory performance, the pump must necessarily be more complex and costly than a fixed displacement pump. In addition, the physical location of the pump is frequently dictated by the drive means employed.

Fuel control systems having positive displacement metering pumps connected to variable speed drive mechanisms which are controlled by computers are known in the art. Although a positive displacement pump is "generally insensitive" to back pressure, it is not so insensitive as to be capable of metering fuel in a highly accurate manner (during engine acceleration and deceleration) when subjected to back pressure variations. In addition, variable speed drive mechanisms in the aforementioned type of systems have not been provided with closed loop controls, thereby permitting load variations imposed upon the pumps to result in consequential speed variations which impair metering accuracy.

Certain engines require highly accurate fuel metering during acceleration and decleration. Hence, it would be highly desirable to provide a fuel control system of the aforementioned type with a capability of accurately metering fuel in accordance with predetermined acceleration and deceleration schedules.

SUMMARY OF THE INVENTION

The invention consists essentially of a positive displacement fuel metering pump and a motor or other variable speed drive mechanism drivingly connected to the pump for controlling the speed of the pump, and hence, the rate of fuel delivery to an engine. The motor or other variable speed drive mechanism, which may be hydraulic, pneumatic or electric, is controlled by a computer, which also may be hydraulic, pneumatic or electric. The computer is adapted to sense a plurality of engine parameters, such as compressor discharge pressure, shaft speed and inlet temperature, and to apply a signal to the motor or other variable speed drive mechanism which is indicative of a requested fuel flow, the magnitude of the signal being determinative of the speed of the motor or other variable speed drive mechanism.

In accordance with the invention, the metering pump may be mounted in or near the tank such that the provision of a boost pump is obviated. Moreover, if a pressure higher than that generated by the metering pump is required for engine delivery, a centrifugal pump may be placed in series flow relationship with the metering pump. It should also be noted that for highly accurate fuel metering, a differential pressure regulator is associated with the metering pump to maintain a relatively constant pressure head thereacross, whereby the metered fuel flow will be a linear function of the motor speed or drive mechanism speed only. In addition, a closed loop control is associated with the motor or drive mechanism to further enhance metering accuracy.

A fuel control system according to the invention is not only simple and inexpensive, but is also advantageous in a number of other respects. For example, the metering pump may be positioned in a location in the fuel tank which eliminates the need for tank pressurization, tank pressurization being normally required to charge a downstream pumping station for preventing excessive vapor to liquid ratios which beget cavitation. Furthermore, if the variable speed drive mechanism is constituted by a motor, engine light-off flow can be effected at zero engine speed since the metering pump is driven independently of the engine. Still further, fuel shut-off can be accomplished by merely turning off the metering pump if a check valve is provided downstream of the pump. In addition, the power required to run the motor is a function of metering pump speed and hence, metered flow. Therefore, minimum power demands are imposed during engine starting when available power would, in all likelihood, be minimal.

Accordingly, it is a primary object of the invention to provide a simplified fuel metering arrangement which is relatively inexpensive.

Another object is to provide a fuel metering arrangement which incorporates a variable speed drive mechanism.

Yet another object is to provide a fuel metering arrangement which incorporates a motor driven pump.

A further object is to provide a fuel metering arrangement wherein a single positive displacement pump functions as a boost pump, main fuel pump, and a metering device.

BRIEF DESCRIPTION OF THE DRAWINGS

FIG. 1 is a simplified block diagram of a preferred fuel control system according to the invention.

FIG. 3 is a schematic diagram of the motor speed control circuit which constitutes a portion of the computer of FIG. 1.

FIG. 4 is a simplified block diagram of another preferred fuel control system according to the invention.

FIG. 5 is a schematic view of an optional metering pump calibration system which may be utilized in conjunction with either the system of FIG. 1. or the system of FIG. 4

DESCRIPTION OF PREFERRED EMBODIMENTS

Figure 2:
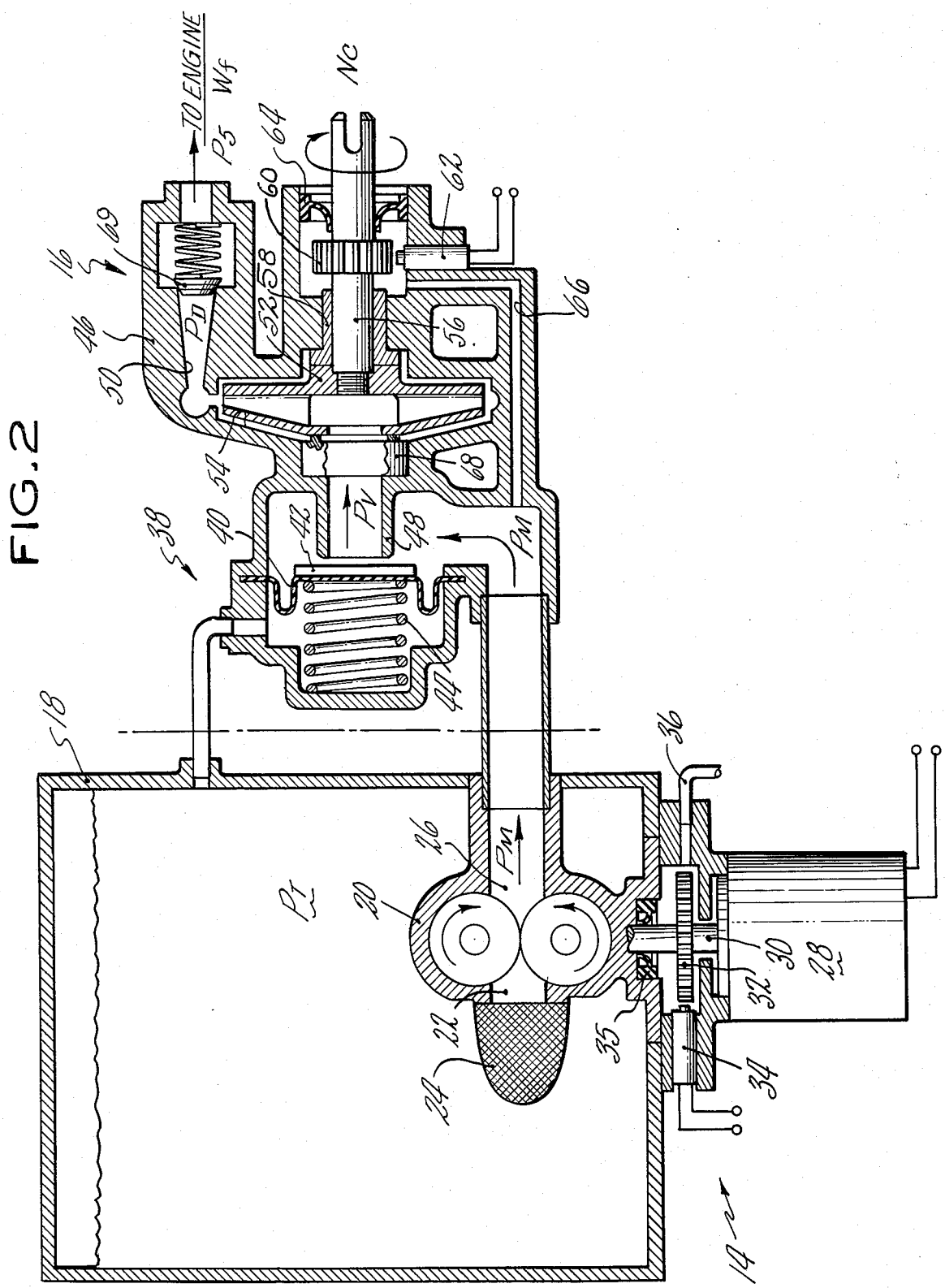
FIG. 2 is a schematic view of the metering pump and the vapor core pump of FIG. 1.

Referring to FIG. 1, a fuel control system comprises an electronic computer 12 which controls the speed of electric motor driven, positive displacement, metering pump 14. The pump 14 is in series flow relationship with an engine driven vapor core pump 16 which functions to raise the pressure of the fuel metered by the positive displacement pump 14 to a level sufficient for delivery to the engine's burners.

The electronic computer 12 is constituted by a scheduling section 12a, which senses various engine parameters to provide an analog fuel flow signal $V_r$, representative of a requested fuel flow. The particular parameters sensed by the scheduling section 12a of the computer 12 and the detailed construction of section 12a are not relevant to the description of the invention since the particular form of computer selected is a matter of design choice dependent upon the engine sought to be controlled and the use to which the engine is applied. It will suffice to note that there are many electronic computers capable of carrying out the invention which are known in the art. For example, the scheduling device shown in U.S. Pat. No. 3,520,133 may be utilized to work the invention. If the fuel control system of the invention is employed in conjunction with a gas turbine engine adapted to propel an airborne vehicle, such as a drone, the parameters sensed by the scheduling section 12a would typically be engine speed, compressor discharge pressure, compressor inlet temperature, fuel tank temperature, and a vehicle velocity error signal.

The computer scheduling section 12a generates a DC analog control signal which is applied to the motor control section 12b of computer 12. This control signal is indicative of a desired fuel flow (as determined by the schedules programmed into the scheduling section 12a) and, in essence, commands a particular pump speed meters fuel flow to the engine. As is discussed hereinafter, the metered flow delivered by the pump 14 is a linear function of metering pump speed, the vapor core pump 16 not affecting the rate of metered fuel flow, but only increasing the pressure thereof.

Turning now to FIG. 2, there is shown a fuel tank 18 having a gear pump 20 mounted therein in such a manner that it is capable of functioning as a boost pump, whereby the provision of a separate boost pump is obviated. The fuel (at pressure $P_T$), proceeding to inlet 22 of gear pump 20, passes through a suitable barrier filter 24 to remove impurities entrained thereby. Metered flow engendered by the intermeshing gears is discharged through an outlet 26 at pressure $P_m$. Gear pump 20 is driven by a permanent magnet DC motor 28 through means of a drive shaft 30 which drivingly interconnects the pump 20 to the motor 28. It will be understood that although the motor 28 is illustrated as being mounted without the fuel tank, it could readily be mounted within the tank as is common practice with existing boost pumps. A toothed wheel 32 is carried by shaft 30 such that the speed of the metering pump 20 is sensed by a magnetic speed pick-up 34 to provide the motor control section 12b of the computer 12 with a signal indicative of metering pump speed, thereby to close the motor speed control loop. In order to prevent leakage from the pump 20 to the electric motor 28, a shaft seal 35 is secured to the pump housing. In addition, a drain conduit 36 is furnished adjacent the toothed wheel 32 to vent fuel seeping past the shaft seal to the atmosphere. However, should the motor be mounted in the tank, the shaft seal and drain conduit may be dispensed with.

It should be noted that an arrangement with the motor in the tank would also permit the tank to be sealed by the provision of a rupture diaphragm (not shown) across the outlet 26. The diaphragm would, of course, be designed to fail upon the imposition of a predetermined pressure upon start-up of pump 20. The uses to which sealed fuel control systems may be applied are numerous.

In general, the fuel flow delivered by a fixed displacement pump may be expressed by the following equation:

$$W_f = K_1 N_p - K_2 \Delta P$$

wherein:
$W_f$ is the fuel flow (1 b/hr.);
$K_1$ is the pump output per revolution (1b-min.)/(hr.-rev.);
$N_p$ is the pump speed (rev./min.);
$K_2$ is a constant reflecting pump geometry;
$\Delta P$ is the pressure rise across the pump $(P_m - P_t)$.

It will be appreciated that in order to obtain a linear schedule of fuel flow versus pump speed, the pump pressure rise must be held constant. To this end, a differential pressure regulator, generally designated at 38, is adapted to maintain the differential pressure $P_m - P_t$ at a relatively constant value, whereby the metered flow rate is essentially a function of only pump speed. Also, it should be noted that the regulator 38 serves a dual function in that it also throttles input flow to the vapor core pump 16, as is discussed hereinafter.

The differential pressure regulator 38 is defined by a diaphragm 40 having a washer 42 secured thereto. The washer 42 acts as a spring seat for compression spring 44, in addition to functioning as a flapper valve for the inlet flow to the vapor core pump 16. The left side of the diaphragm 40 is referenced to tank pressure $P_t$ and the right side thereof is referenced to pressure $P_m$ (and vapor core pump inlet pressure $P_v$ which remains relatively constant), pressure $P_m$ being the discharge pressure of the metering pump 20. By the throttling of flow into the vapor core pump 16, the metering rise $(P_m - P_t)$ is maintained at a generally constant value (e.g., 5 psi).

The vapor core pump 16 is a centrifugal pump which has a full flow performance comparable to that of a conventional centrifugal pump, but differs therefrom in that a portion of its internal volume is normally occupied by a vapor so that the pump does not run full. In such a pump, the size of this core is determined not only by the pump speed, but also by the output or discharge pressure thereof. For example, if the "vapor core" is large, the output pressure is low; and conversely, if the "vapor core" is small, the output pressure is large. Vapor core pumps are known in the art and are described in detail in U.S. Pat. Nos. 3,265,000; 3,142,255; 3,128,822 and 3,106,165, which should be referred to for a more elaborate discussion of their construction and operation.

In the present fuel control system, the vapor core pump output pressure $P_d$ is a function of the compressor discharge pressure and combustor nozzle restriction characteristics. Hence, compressor discharge pressure and nozzle characteristics are the parameters which dictate the volume of the "vapor core" for a fixed vapor core pump speed. In a fuel control system of the invention, it will be appreciated that a vapor core pump is advantageous since the desired output pressure thereof is automatically obtained by changes in the volume of the vapor core.

The vapor core pump 16, schematically depicted in FIG. 2, has a housing 46 with an inlet conduit 48 and an outlet conduit 50 formed therein. A centrifugal impeller 52 is mounted for rotation within a pumping cavity 54 by means of a shaft 56, journalled in a carbon bushing 58 and drivingly connected to the engine so as to be rotated thereby. The shaft 56 carries a toothed wheel 60, similar to the wheel 32, adjacent a magnetic speed pick-up 62 which is mounted in the housing 46. The speed pick-up 62 thus generates a signal indicative of actual engine speed which is directed to section 12a of computer 12. A shaft seal 64 surrounds shaft 56 to the right of the toothed wheel 60 to contain any pressurized fuel which leaks past bushing 58. A duct 66 communicates with the contained fuel such that it may be bypassed back to a location intermediate the upstream side of the differential pressure regulator 38 and downstream of the discharge side of gear pump 20. Also mounted in an annular recess in inlet conduit 48 is a spring loaded, carbon faced, shaft seal 68 which isolates the inlet conduit 48 from the high pressure fuel at the periphery of the impeller 52.

It will be noted that the washer 42 of the regulator 38 forms, together with the entrance of inlet conduit 48, a flapper valve arrangement which functions to partially vaporize the fuel entering the inlet conduit at pressure $P_v$. The droplets and vapor pass through the inlet conduit and enter the core or eye of the impeller 52, and thence proceed to the periphery of the impeller where the vapor and droplets combine to form a liquid which is discharged through conduit 50.

To prevent any discharge flow from conduit 50 when gear pump 20 is shut down, a spring loaded, sealing check valve 69 is positioned in conduit 50 downstream of the vapor core pump impeller 52. When motor 28 is turned off, fuel is not directed to inlet conduit 48, and hence, the impeller 52 does not develop pressure, thereby resulting in a consequential closing of the check valve 69. A starting of the motor 28 causes the metering pump 20 to develop sufficient pressure to open the valve 69. A typical cracking pressure for valve 69 would be 2 psi. Hence, in the illustrated fuel control system, a separate shut-off valve is unnecessary.

The selection of an electric motor to carry out the invention — if an electric motor is utilized — and the control circuitry therefor admits of a number of options, as will be apprehended by those skilled in the motor control art. However, the well-known pulse width modulation control technique is preferable since it minimizes power dissipation. U.S. Pat. No. 3,509,479 discusses this technique and discloses a circuit for controlling a DC motor. An example of a closed loop control circuit is shown in FIG. 3.

The speed control circuit FIG. 3 includes a summer 70 which has as its primary inputs the commanded speed signal $V_R$ from the computer scheduling section 12a and an actual speed feedback signal $V_A$ from the metering pumps speed pick-up, as modified by a frequency to DC converter 71. A fuel temperature compensation signal $V_{FT}$ may also be applied to the summing junction 70, as would be typically derived from a thermistor in the fuel tank 18 and a signal processing circuit. The summing junction 70 generates a speed error signal $V_E$ which is directed to a filter and gain compensation network 72 to provide a high loop gain for steady-state accuracy and stability. The output signal of the gain compensation network 72 is, in turn, directed to a fixed frequency, variable duty cycle oscillator 74, which generates a square wave form having a voltage +V for a portion of each cycle, and zero voltage for the remaining portion of each cycle. The respective fractions of a cycle during which the output of the oscillator 74 is +V and zero are, of course, dictated by the magnitude of the signal from the gain compensation network 72.

The voltages +V and zero are successively applied to the base electrode of a transistor, $Q_1$ to respectively cause it to conduct and to be driven into cut-off. The collector of transistor $Q_1$ is connected to a first source of potential (e.g., 12 volts) via a resistor $R_1$ and the emitter thereof is referenced to ground potential. The motor 28 has one terminal connected to a second source of potential (e.g., 28 volts) and the other terminal connected to ground potential via a power switch which includes transistor $Q_2$ and a current sensing resistor $R_2$ interposed between the emitter of $Q_2$ and ground potential. Another transistor $Q_3$ in the power switch has its collector connected to the collector of transistor $Q_2$, and its emitter connected to the base electrode of $Q_2$, whereby a positive voltage at the base electrode of $Q_3$, drives $Q_2$ and $Q_3$ into a conductive state which produces a current flow in the motor armature. Obviously, when transistor $Q_1$ is driven into a conductive state by the application of a positive voltage to the base electrode thereof, its collector is essentially placed at ground potential, whereby $Q_2$ and $Q_3$ are nonconductive as the base electrode of $Q_3$ is connected to the collector of $Q_1$. Conversely, when $Q_1$ goes to cut-off, transistors $Q_2$ and $Q_3$ are driven into a conductive state by the application of a positive potential to the base of $Q_3$.

The terminals of the motor 28 are interconnected by a diode $CR_1$ to establish a closed loop decay current path through the armature when the power switch is turned off so as to remove the supply voltage thereacross, the decaying current flow in the armature being due to the inductance thereof. Hence, for a given duty cycle and load, the armature current has a generally fixed magnitude with a superimposed ripple thereupon which has a frequency equal to that of the oscillator 74.

During starting, when the back EMF is low and the supply voltage is applied to the motor terminals, excessive armature currents would be encountered. In order to forestall the development of such currents, a current limiting circuit 76 is connected to the emitter of transistor $Q_2$ to sense the voltage drop across resistor $R_2$ and to the base electrode of $Q_1$ through a diode $CR_2$. Current limiting circuit 76 may include an operational amplifier adapted to have a normally negative output and to change state so as to produce a positive output when the voltage drop across $R_2$ attains a predetermined value. Such an arrangement would necessarily include a means to maintain a positive output (such as a capacitor to provide positive feedback to the amplifier input) on the amplifier for a predetermined period so that the oscillator 74 does not switch $Q_1$ off during the period, the period embracing a number of oscillator cycles.

In operation, the scheduling section 12a of computer 12 delivers a signal indicative of a requested fuel flow to the motor control section 12b of computer 12, this signal being a function of the sensed engine parameters. The motor control section 12b drives speed motor, and hence the gear pump 20, at a pseed sufficient to provide a fuel flow as demanded by the scheduling section 12a. Metered flow from the gear pump 20 is directed to the vapor core pump 16 via the differential pressure regulator 38 which throttles flow thereto and maintains a constant head across the gear pump. Fuel is directed to the engine burners through suitable nozzles after the vapor core pump has amplified the pressure level to that required for engine delivery.

An obvious modification of the system of FIG. 1 is shown in FIG. 4 where the electric motor has been replaced by a variable speed drive mechanism in the form of a magnetic clutch assembly 80, such devices being known in the art. The clutch assembly is connected to a shaft 82 which, in turn, is adapted to be connected to the gear box of the gas turbine engine sought to be controlled. A second shaft 84 interconnects the metering pump 14 and the clutch assembly 84. The clutch assembly 80 varies the speed of the pump 14 as a function of the requested fuel flow signal $V_r$ (FIG. 3) from the computer scheduling section 12'a of electronic computer 12'. In the embodiment of FIG. 4, the requested fuel flow signal $V_r$ is applied to an electronic clutch control section 12'b which directs and electrical control signal to the clutch assembly 80. The clutch control circuit also has as an input the metering pump speed (for closed loop control).

FIG. 5 shows an arrangement which is capable of being utilized with either the embodiment of FIG. 1 or the embodiment of FIG. 4 to compensate for pump wear as would be occasioned by pumping contaminated fuel and/or a long period of use. As shown in FIG. 5, flow from the vapor core pump 16 is selectively directed to either a main fuel supply conduit 86 or a flow measuring conduit 88, depending on the position of a conduit selector valve 90. The flow measuring conduit 88, which is in parallel flow relationship to conduit 86, joins the main fuel supply conduit 86 at a downstream location so that all the flow in the conduit 88 is directed to the engine. Fuel flow in the conduit 88 traverses a flowmeter 92 which generates an electrical signal indicative of the actual fuel delivery rate to the engine. Since the accurate functioning of exiting flow meters is adversely affected by operation in contaminated fluid for prolonged periods, a barrier filter 94 is provided in the conduit 88 between the valve 90 and the fuel flow meter 92. It will be appreciated that the barrier filter need only be cleaned at infrequent intervals because flow will pass therethrough only during calibration. In addition, this permits the filter to be a minimal size for fine filtration.

In order to calibrate metering pump 14, a calibration signal is applied to the computer which, in turn, generates a signal causing the valve 90 to rotate clockwise such that all incoming flow enters flow measuring conduit 88. Two or more flow settings are then demanded from which a calibration and subsequent reset of the signal $V_r$ in FIG. 3 will be made in computer 12. Upon completion of the calibration, valve 90 is commanded to rotate counterclockwise such that all flow reverts back to conduit 86. Digital electronic computers suitable for the proposed application have the capability and can be programmed by those skilled in the art to provide the required calibration. Permanent storage of the calibration would be made until such time as a command is given again to calibrate the system.

It must be stressed that the invention is not limited to pumping systems which incorporate electric motors, clutches, computers and controls, since the advantages of the invention are obtainable with mechanical pneumatic or hydraulic components, as will be apprehended by those skilled in the art.

For example, it should be apparent that the system of FIG. 1 could also be modified by substituting a traction drive mechanism connected to an engine driven shaft for the electric motor. Using a drive mechanism connected to an engine driven shaft however, could detract from the advantage of mounting the metering pump in or in close proximity with the fuel tank. However, the advantage over the electric motor driven pump would be the relatively unlimited power transmission due to practical size limitations. Also, the vapor core pump may be eliminated if the require fuel delivery pressure is of a value which the metering pump, per se, can generate.

Obviously, many variations are possible in view of the above teachings without departing from the scope or spirit of the invention as defined in the subjoined claims.

We claim:
1. A fuel control system for an engine comprising:
 a computer scheduling section to sense selected engine parameters and to generate a fuel flow signal indicative of a scheduled fuel flow;
 a positive displacement metering pump for pumping a metered fuel flow to the engine, the fuel flow increasing with the speed of the metering pump;
 a variable speed drive mechanism drivingly connected to the metering pump to run the metering pump;
 means for generating a feedback signal indicative of the actual speed of the metering pump;
 a computer control section, having a summing means, operatively connected to the variable speed drive mechanism for controlling the speed thereof and hence the speed of the pump, the summing means being adapted to receive and sum the fuel flow signal and the feedback signal for generating an error signal; and
 a throttling type differential pressure regulator operatively connected to the pump for maintaining a substantially constant pressure head across the pump to linearize the relationship between the fuel flow and the pump speed.

2. The fuel control system of claim 1, wherein the computer scheduling section and the computer control section are electronic components and wherein the variable speed drive mechanism is an electric motor.

3. The fuel control system of claim 1, further including:
a vapor core pump fluidly connected to the metering pump for raising the pressure of the fuel pumped thereby;
and wherein the differential pressure regulator is connected to the inlet of the vapor core pump to throttle the flow thereto.

4. The fuel control system of claim 1, further including:
a fuel tank, the positive displacement pump being mounted therein.

5. The fuel control system of claim 3, further including:
a fuel tank, the positive displacement pump being mounted therein.

6. The fuel control system of claim 5, further including:
means to connect the vapor core pump to the engine such that it is driven thereby.

7. The fuel control system of claim 1, further including:
a main fuel supply conduit upstream of the engine for receiving the metered fuel flow;
a flow measuring conduit in parallel flow relationship to the main fuel supply conduit;
valve means for directing the metered fuel flow to either the main fuel supply conduit or the flow measuring conduit; and
a flow meter operatively connected to the flow measuring conduit to generate a signal to the computer indicative of the metered fuel flow for the calibration of the computer.

8. The fuel control system of claim 7, further including:
a barrier filter positioned in the flow measuring conduit upstream of the flow meter for filtering flow to the flow meter.

* * * * *